United States Patent [19]

Mittelhäuser

[11] Patent Number: 4,504,117
[45] Date of Patent: Mar. 12, 1985

[54] REAR VIEW MIRROR FOR VEHICLES WITH POTENTIOMETRIC ANGULAR POSITION DETECTORS

[76] Inventor: Bernhard Mittelhäuser, No. 57, D-3002 Wedemark 2, Fed. Rep. of Germany

[21] Appl. No.: 484,164

[22] Filed: Apr. 12, 1983

[30] Foreign Application Priority Data

Apr. 14, 1982 [DE] Fed. Rep. of Germany ....... 3213694

[51] Int. Cl.³ .......................... G02B 7/18; G05B 19/42
[52] U.S. Cl. .................................... 350/636; 318/568; 350/634
[58] Field of Search ................ 350/289, 288; 318/568, 318/663; 364/42 S

[56] References Cited

U.S. PATENT DOCUMENTS 4,153,342  5/1979  Mittelhauser ...................... 350/289
4,267,494  5/1981  Matsuoka et al. .................. 318/568

FOREIGN PATENT DOCUMENTS 54-35934   3/1979  Japan ................................. 350/289
54-102734  8/1979  Japan ................................. 350/289

Primary Examiner—Jon W. Henry
Attorney, Agent, or Firm—Becker & Becker, Inc.

[57] ABSTRACT

A rear view mirror having a mirror body which can be adjusted about a horizontal axis and about a vertical axis. In order to assure an optimum mirror position, and in particular possibly even when an unintended shifting of the mirror out of position has occurred, a device is associated with the mirror for ascertaining, storing, and possibly also indicating the position of the mirror. Accordingly, for example when entering the vehicle in the dark, one can ascertain whether the mirror has the desired position. Under these conditions, the position of the mirror can be corrected as a function of the stored or indicated values.

13 Claims, 4 Drawing Figures

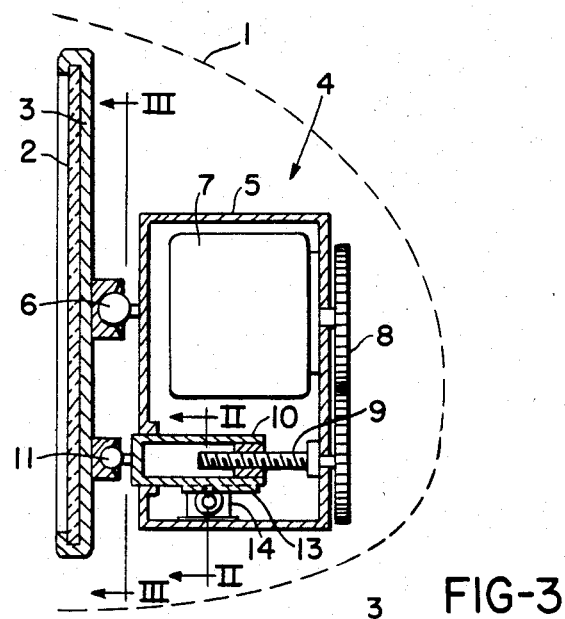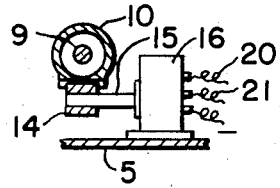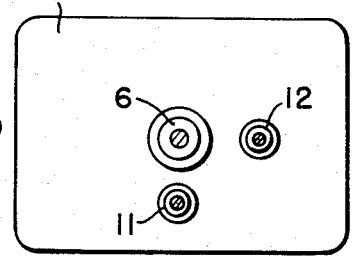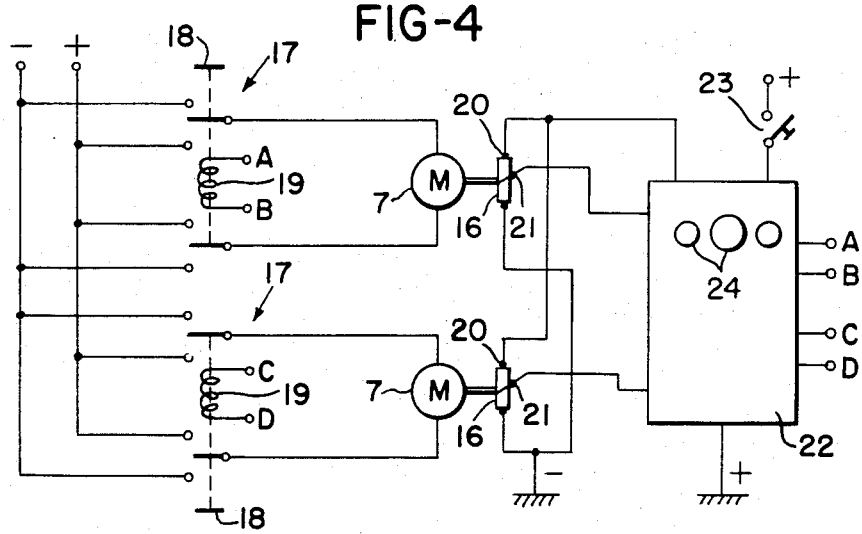

REAR VIEW MIRROR FOR VEHICLES WITH POTENTIOMETRIC ANGULAR POSITION DETECTORS

BACKGROUND OF THE INVENTION

The present invention relates to a rear view mirror for vehicles, especially to an external rear view mirror, which is preferably intended for use for passenger cars or trucks. In particular, the present invention relates to those mirrors, the mirror body of which can be adjusted about a vertical axis and about a horizontal axis.

The vehicle operator is dependent to a certain extent upon an optimum adjustment of his mirror, since only then can the desired viewing angle be achieved. However, the adjustment of a mirror requires not only a certain skill, rather, the illumination when making the adjustment of the mirror must be great enough. During unfavorable weather conditions, especially however in the darkness, it is very difficult to make a good adjustment of the mirror. Beyond that, it is even more important under these conditions, however, then a control over the desired adjustment of the mirror is practically impossible. An intended, especially however an unintended or malicious shifting out of adjustment of the mirror by a third party can lead to considerable danger, since the operator, due to the lack of a possibility of control, feels assured that he is using a properly adjusted mirror.

It is essentially an object of the present invention to embody a mirror of the aforementioned general type in such a way that a certain, desired, and optimum adjustment of the mirror is assured, and in particular, possibly also under the assumption that an unintended shifting of the mirror out of adjustment has occurred.

BRIEF DESCRIPTION OF THE DRAWING

This object, and other objects and advantages of the present invention, will appear more clearly from the following specification in conjunction with the accompanying drawings, in which:

FIG. 1 is a vertical cross section through one embodiment of an inventive external mirror for a road vehicle;

FIG. 2 is a partial section through the mirror of FIG. 1 taken along the line II—II thereof;

FIG. 3 is a section taken along the line III—III of FIG. 1; and

FIG. 4 is an electrical circuit diagram for the mirror of FIG. 1.

SUMMARY OF THE INVENTION

The rear view mirror of the present invention is characterized primarily by associating therewith a device which ascertains the position of the mirror, and possibly also stores and/or indicates this position.

Such a device can be of the mechanical type, in other words, can be provided with sensors which contact the mirror body in order with the aid of these sensors to indicate the position of the mirror, for example by means of a pointer which is provided with angular readings. Optical means are also possible, such as signals which can be seen in the dark and in conformity with which the mirror body is aligned with certain marks, and with the aid of which a control of the position of the mirror body is possible. Preferably, however, electrical or electronic means are provided in order to be able to realize the object of the present invention. These means are particularly applicable when the adjustment of the mirror is effected by electric motors. Under these conditions, it is possible to electrically control the position of the mirror, and to control the electric motors with the aid of the thus produced electrical values. For this purpose, potentiometric angular position detectors are preferably associated with the adjusting elements of the mirror. The values of these detectors is stored and can later be used for a readjustment of the mirror should the latter be shifted out of adjustment. However, it is also possible to measure the resulting voltages so that values can be directly derived herefrom for the adjustment of the mirror.

Pursuant to specific features of the present invention, it may be possible to correct the position of the mirror as a function of the stored values. It may also be possible to select the position of the mirror at the storage device. The adjustment of the mirror may be carried out manually and as a function of the stored values.

If potentiometric angular position detectors are provided for the two adjustment possibilities (about a vertical and a horizontal axis), an adjustment element which pivots the mirror body by means of a longitudinal movement may be provided with a rack or a rack-like gearing which meshes with a pinion arranged on the shaft of the potentiometer. A correction of the position of the mirror may be effected as a function of electrical pick-up at the potentiometers.

The storage unit or computer may be switched on by actuation of the ignition of the vehicle. The storage unit or computer may also be provided with an electrical power source which is independent of external voltage.

The switch which serves for actuation of the adjustment motors may be operated mechanically by hand and electromagnetically. Different positions of the mirror may be stored by the storage device, and may be recalled by means of a register or the like. Optical angular position indication may be effected as a function of the electrical pick-up at the potentiometers.

DESCRIPTION OF PREFERRED EMBODIMENTS

Referring now to the drawing in detail, the mirror body 2 is located in a shell-like housing which is indicated by the dashed line 1. Also located in the housing are the mounting support 3 for the mirror body 2, and the adjusting mechanism 4 which, along with the mounting support 3, also serves to hold the mirror body 2 within the housing.

The adjusting mechanism 4 in turn is provided with a box 5 which also supports the ball 6 of a ball-and-socket joint with which the mirror body 2 is associated so that it can be adjusted in all directions. In order to be able to effect this adjustment with motors, two essentially identical adjustment devices are provided, each of which has an electric motor 7, a gear drive 8, a spindle 9, and a bolt 10 for engaging the spindle 9. To adjust the mirror body about a horizontal axis, the spindle 9 acts on the mounting support 3 by means of a ball-and-socket joint 11, and to adjust the mirror body 2 about a vertical axis, the spindle 9 acts on the mounting support 3 by means of a ball-and-socket joint 12 (FIG. 3).

To adjust the mirror body 2, the electric motor is rotated clockwise or counterclockwise, thus turning the spindle 9 by means of the gear drive 8. The spindle 9 in turn moves the bolt 10 in one or the other of the longitudinal directions thereof. The mirror body 2 executes an appropriate pivot movement in conformity therewith.

The bolt 10, which is hollow for engagement of the spindle 9, has an outer profile in the form of a rack 13 which meshes with a pinion 14 on the shaft 15 of a resistive potentiometer 16. With the longitudinal adjustment of the bolt 10, or a corresponding adjustment of the mirror body 2, the potentiometer 16 also undergoes a corresponding adjustment; the concurrently detected resistance values are a measure for the position of the mirror body 2. This is true not only for a pivoting of the mirror body 2 about the vertical axis, but also for a pivoting of the mirror body 2 about the horizontal axis.

Each of the electric motors 7 provided for the two pivoting possibilities has a switch 17, which in one position effects counterclockwise rotation of the electric motor 7, and in the other position effects clockwise rotation of the electric motor 7. Actuation of the switch 17 can either be manual by handles 18, or electrical by means of a coil 19.

The potentiometers 16 provided for the two pivoting possibilities are commonly grounded, but their upper connections 20 and their changing pick-ups 21 lead to a computer 22 to which voltage is applied via a switch 23 which is preferably connected or disconnected when the ignition of the vehicle is actuated.

The computer 22 also has connections A, B, C, and D which are provided for the coils 19 in order in this way to also be able to actuate the two switches 17 by means of the computer 22.

The computer 22 can, of course, be provided with a power source which is independent of the voltage.

It is important that via the potentiometer 16, after adjusting the mirror body 2 by hand via the switch 17, appropriate voltage drops result at the potentiometers 16, the values of these voltage drops being stored by the computer 22. These values, which establish the position of the mirror and fix the latter, are associated with a specific person, who has determined these values by adjusting the mirror body 2.

If now, for example in the dark, the mirror body 2 is shifted out of adjustment from the outside by an intruder, the computer 22 becomes operative by actuating the switch 23 (for example before driving at night), and in particular in that the computer 22 transmits the stored values over the connections A-D to the switch 17. When, after a readjustment, the potentiometers 16 again indicate the old, previously stored values, the original mirror position is again achieved and thus assures that the mirror body 2 has assumed its aforementioned selected position.

However, it is also possible to associate a register with the computer 22 in order in this way to be able to recall values, which conform to different people, for adjusting the mirror body 2. For this purpose, appropriate actuating and selecting buttons are provided. If the computer 22 is located in the vicinity of or on the dashboard of the vehicle, the driver can operate the selection buttons 24 directly.

Furthermore, the potentiometer 16 directly or indirectly can indicate the angular positions of the mirror body 2 via the computer 22. However, this can be accomplished also by independent indicators. This aforementioned indication represents the actual values; however, by recall of the computer 22, the desired values also can be indicated, which desired values then can be set, for example by manual adjustment of the switch 17.

Especially important are the potentiometers 16, which ascertain the position of the mirror, particularly in connection with the computer 22, which primarily serves to store the values of the position, but also, as mentioned above, serves for the program control or the readjustment, which are effected as a function of the desired values set by the user.

The present invention is, of course, in no way restricted to the specific disclosure of the specification and drawing, but also encompasses any modifications within the scope of the appended claims.

What I claim is:

1. A rear view mirror for vehicles, said mirror comprising:
    a mirror body which can be adjusted about a horizontal and a vertical axis;
    a device associated with said mirror body for ascertaining the position thereof;
    a first potentiometric angular position detector associated with said adjustment about a horizontal axis;
    a second potentiometric angular position detector associated with said adjustment about a vertical axis; and
    each of said detectors being provided with a shaft which in turn is respectively provided with a pinion; which includes a respective adjustment element for said horizontal adjustment and for said vertical adjustment of said mirror body, with pivoting of the latter about an axis therewith respectively being effected by a longitudinal movement of the respective adjustment element; with each adjustment element being provided with a rack-like element which meshes with one of said pinions.

2. A mirror according to claim 1, in which said device stores the value of the position of said mirror body.

3. A mirror according to claim 2, in which said device is a computer which is adapted to be turned on by actuation of a vehicle ignition.

4. A mirror according to claim 2, in which said device is a computer which is provided with its own electrical power source which is independent of external voltage.

5. A mirror according to claim 1, in which said device indicates the value of the position of said mirror body.

6. A mirror according to claim 1, in which said device stores and indicates the value of the position of said mirror body.

7. A mirror according to claim 1, which includes correction means for correcting the position of said mirror body as a function of a stored value.

8. A mirror according to claim 7, in which said correction means includes manual means.

9. A mirror according to claim 8, in which said manual means includes a switch which can be operated manually and electromagnetically for actuating adjustment motors.

10. A mirror according to claim 1, which includes means on said device for selecting the position of said mirror body.

11. A mirror according to claim 10, which includes a register, and in which said device is adapted to store different mirror positions, which can be recalled by said register.

12. A mirror according to claim 1, which includes means of correcting the position of said mirror body as a function of said stored value, with said correction being effected as a function further of electrical pick-up at said potentiometric detectors.

13. A mirror according to claim 1, which includes means for indicating angular position as a function of electrical pick-up at said potentiometric detectors.

* * * * *